3,055,784
ETHYLENE POLYMER LAMINATED STRUCTURES
Milton John Roedel, Crestfield, Del., assignor to E. I. du Pont de Nemours and Company, Wilmington, Del., a corporation of Delaware
Original application Apr. 28, 1955, Ser. No. 504,511. Divided and this application June 30, 1959, Ser. No. 824,026
2 Claims. (Cl. 154—50)

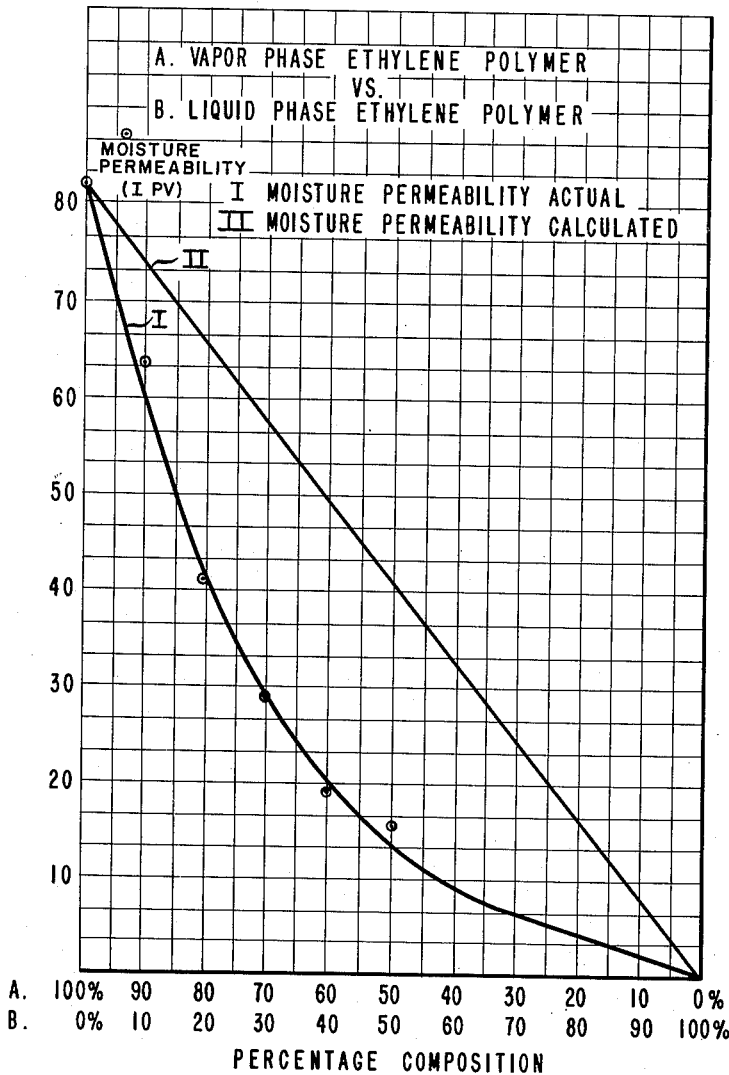

This invention relates to a process of polymerizing ethylene to high density polymers and more particularly to the polymerization of ethylene in an improved reaction environment and to products produced therefrom. This application is a division of my copending application Serial No. 504,511, filed April 28, 1955, now abandoned. U.S. Patent 2,983,704 resulted from a continuation of this abandoned application.

It is known that ethylene can be polymerized under various conditions with the aid of such catalysts as oxygen, persulfates, dialkyl peroxides, azo compounds, and the like. All of these prior processes employ highly compressed gaseous ethylene, alone or in admixture with organic or inorganic liquids, and temperatures of 40° C. and above. Such conditions are commercially feasible, but because of the high pressures employed require costly equipment. Also, the polymer obtained under these conditions, while more resistant to moisture than most other polymers, still has a moisture permeability which is undesirably high for many purposes. This is believed to be due, at least in part, to the branched chain structure and possibly to the high amorphous content.

An object of the present invention accordingly is to provide a process for polymerizing ethylene which avoids the need for using costly, high pressure equipment and which produces ethylene polymers possessing a high degree of linearity, high density, high degree of crystallinity, and which forms film possessing a high degree of moisture impermeability. Another object is to provide ethylene polymer blends. Other objects and advantages of the invention will hereinafter appear.

The above and other objects of the invention are realized by cooling ethylene below its critical temperature of 9.6° C. under sufficient pressure to liquefy the ethylene, and then polymerizing the ethylene to a solid polymer in liquid ethylene as a reaction medium. For most effective operation of the process, the polymerization is carried out in the presence of an ethylene polymerization catalyst and under various other conditions hereinafter specified.

Useful catalysts for the process include the metal alkyls, the aliphatic azo compounds of Hunt, U.S. 2,471,959, issued May 31, 1949, peroxygen compounds, and other compounds which yield reactive free radicals below 9.6° C. The activity of the metal alkyls is improved by certain metals, viz., copper, silver, gold, iron, cobalt, and nickel, or their salts. The activity of the peroxygen compounds is improved by silver ions or by ions of one or more polyvalent metals of atomic number 22 to 29, inclusive (titanium, vanadium, chromium, manganese, iron, cobalt, nickel and copper), in their lower state of oxidation, ferrous ions being preferred for economic and other reasons. The polyvalent metal ion may either be introduced in the lower state of oxidation or reduced in situ by a supplementary reducing agent, such as bisulfites, thiosulfates, sulfinic acids, benzoin, 1-ascorbic acid, primary, secondary and tertiary amines, sodium formaldehyde sulfoxylate, and like reducing compounds.

The following examples illustrate in detail how to produce polymers of ethylene possessing a high degree of moisture impermeability.

EXAMPLE 1

A 325 cc. stainless steel shaker tube was charged with 100 cc. of methanol and 1.0 gram of 1-hydroxycyclohexyl-1-hydroperoxide, commonly known as cyclohexanone peroxide. The tube was then flushed with nitrogen, evacuated to constant pressure to remove the nitrogen and cooled to about −50° C. in a Dry Ice/methanol bath. There was then added to the cold tube 2.0 cc. of 0.090% solution of ferrous chloride tetrahydrate in methanol which is a ferrous ion concentration based on 100 grams of monomer of 5 parts per million. There was also added 1.0 gram of 1-ascorbic acid plus 12 cc. of methanol. The tube was flushed with nitrogen, evacuated, cooled to about −50° C. and charged with 108 grams of liquid ethylene. The tube was then placed in a shaker machine and the machine started. After the tube had warmed up to −20° C. it was removed from the shaker machine and totally immersed in an ice/ice water mixture and thus maintained at 0° C. for 18 hours. The pressure dropped during this period from 1410 lb./sq. in. to 1010 lb./sq. in. The unreacted ethylene was bled off at 0° C. and the tube opened. A dispersion of ethylene polymer in methanol had formed. The ethylene polymer was filtered off and washed first with methanol, then water and finally with acetone. The yield of solid ethylene polymer was 14.1 grams. A hot pressed film of the polymer was hard and stiff. The melting point was 120° C. The moisture permeability value was less than 10 units and the density was 0.9745 g./cc. at 25° C.

EXAMPLE 2

A 325 cc. stainless steel shaker tube was charged with 1.0 cc. of 0.90% methanol solution of ferrous chloride tetrahydrate, the methanol evaporated off with an air stream, and then 1.0 gram of 1-ascorbic acid and 1.0 gram of 1-hydroxycyclohexyl-1-hydroperoxide were added. The tube was flushed with nitrogen, evacuated, cooled to about −50° C., and 173 grams of liquid ethylene was added. The tube was warmed to −3° C. in a shaker machine and the pressure released to 4500 lb./sq. in. whenever it exceeded 4500 lb./sq. in. The tube was then immersed in an ice/ice water bath and maintained at 0° C. for 19.5 hours. The pressure dropped from 4500 lb./sq. in. to 4100 lb./sq. in. during this period. The unreacted ethylene was then bled off at 0° C. and the tube opened. The solid polymer of ethylene was obtained as a fluff which after washing with water, methanol, and acetone, possessed a melting point of 118° C. and gave a very stiff film.

EXAMPLE 3

A 325 cc. stainless steel shaker tube was charged with 85 cc. of tertiary butyl alcohol, 10 cc. methanol, 1.0 gram 1-ascorbic acid and 1.0 gram of 1-hydroxy-cyclohexyl-1-hydroperoxide. The tube was flushed with nitrogen, evacuated, cooled to about −50° C. and 5.0 cc. of an 0.18% solution of ferrous chloride tetrahydrate in methanol was added. The tube was again flushed with nitrogen, evacuated, cooled to about −50° C. and 100 grams of liquid ethylene was added. The tube was cooled to −80° C. in a shaker box and immersed in an ice/ice water bath at 0° C. for 17.5 hours. During this time the pressure ranged from 530 to 550 lb./sq. in. The unreacted ethylene was bled off at 0° C. A dispersion of ethylene polymer in alcohol was obtained. The ethylene polymer was washed with water, methanol and acetone. The yield was 7.2 grams of solid, powdery ethylene polymer. The melting point was 126.5° C. A hot molded article was hard, stiff, glossy, mar-resistant and possessed a density of 0.980 at 25° C. and a moisture permeability value of less than 10. When this ethylene polymer was applied as a hot melt to paper an adherent coating was obtained that was glossy, hard and mar-resistant. A blend of 20 grams of this ethylene polymer with 80 grams of paraffin wax gave coatings on paper that were glossy and tough as compared to the dull, weak coatings obtained from 100 percent paraffin wax.

EXAMPLE 4

A 325 cc. stainless steel shaker tube was charged with 100 cc. methanol and 1.0 cc. of tertiary butyl perbenzoate. The tube was flushed with nitrogen, evacuated and cooled to about −50° C. There was then added 2.0 cc. of a 0.090% solution of ferrous chloride tetrahydrate in methanol, 1.0 gram 1-ascorbic acid and 12 cc. methanol. The tube was again flushed with nitrogen, evacuated and cooled to about −50° C., and 100 grams of liquid ethylene was added. The tube was agitated in a shaker box, while the contents warmed to 0° C. The tube was immersed in an ice/ice water bath and maintained at 0° C. for 17 hours. The pressure ranged from 560 to 870 lb./sq. in. Unreacted ethylene was bled off at 0° C. and the tube opened. A dispersion of ethylene polymer in methanol was obtained. The dispersion was filtered, the ethylene polymer was washed and dried. The solid ethylene polymer thus obtained had a density of 0.9737 g./cc. at 25° C. and moldings were hard and stiff.

EXAMPLE 5

A four-liter stirred, stainless steel autoclave was charged with 850 grams tertiary butyl alcohol, 75 grams methanol, 10 grams succinic acid peroxide, and 10 grams of 1-ascorbic acid. The autoclave was then evacuated, cooled to 0° C., and 1000 grams of liquid ethylene was added with cooling to 0° C. Thereafter there was added at 0° C. 75 grams of methanol and 2.0 cc. of a 0.90% solution of ferrous chloride tetrahydrate in methanol. Polymerization was carried out for 4 hours at 1–2° C. at a pressure of 550–560 lb./sq. in. Unreacted ethylene was bled off and the autoclave discharged at 0° C. A dispersion of ethylene polymer was obtained. The polymer was filtered off and washed well with methanol. The solid ethylene polymer obtained was stiff in the form of bars and films and melted at 123° C.

EXAMPLE 6

A four-liter stirred, stainless steel autoclave was charged with 800 grams methanol, 2.0 grams 1-ascorbic acid, and 2.0 cc. of a 0.9% solution of ferrous chloride tetrahydrate in methanol. The autoclave was evacuated, flushed with ethylene, evacuated, again cooled to 0° C. and 1000 grams of liquid ethylene was added at 0° C. Thereafter 100 cc. of deoxygenated water and 2.0 grams ammonium persulfate were added. Polymerization was carried out for 2¾ hours at 0° C.–2° C. at an autogenous pressure of 570–600 lb./sq. in. Unreacted ethylene was bled off at 0° C. and the autoclave discharged at 0° C. A dispersion of ethylene polymer was obtained. The dispersion was coagulated by addition of an equal volume of water, filtered, the ethylene polymer was washed first with water and then with methanol. The solid ethylene polymer was stiff in the form of bars and films and possessed a density of 0.9709 g./cc. at 25° C.

EXAMPLE 7

A 325 cc. stainless steel lined shaker tube was charged with 90 cc. methanol and 1.0 gram of sodium formaldehyde-sulfoxylate dihydrate. The tube was then flushed with nitrogen, evacuated and cooled to about −50° C. There were then added 1.0 cc. of a 0.090% solution of ferrous chloride tetrahydrate in methanol, 9 cc. methanol, and 2.0 grams 1-hydroxycyclohexyl-1-hydroperoxide. The tube was again flushed with nitrogen, evacuated and cooled to about −50° C., 100 grams of liquid ethylene was added, the tube warmed to 0° C. in a shaker machine, and immersed in an ice/ice water bath at 0° C. for 18 hours. The pressure ranged from 620–650 lb./sq. in. during this period. The ethylene polymer dispersion formed was filtered, and the ethylene polymer washed first with methanol, then with water, and finally with methanol. The solid polymer obtained was stiff in the form of bars and films and possessed a density of 0.9858 g./cc. at 25° C.

EXAMPLE 8

A solution of 4 grams of benzoyl peroxide and 0.15 gram of ferric acetylacetonate in 100 ml. of thiophene-free benzene was charged into a 1600 ml. stainless steel autoclave. A test tube containing 4 grams of triethanolamine was suspended in the autoclave so that its contents would be emptied when the autoclave was rocked. The autoclave was flushed three times with nitrogen, cooled in Dry Ice, evacuated and charged with 280 grams of liquid ethylene. The autoclave was then brought to a temperature of 0° C. and rocked for 20 hours. The reaction mixture was discharged and the ethylene polymer removed by filtration. The melting point of the polymer was 120° C.

EXAMPLE 9

A solution of 4 grams of benzoyl peroxide in 150 ml. of thiophene-free benzene was charged into a 1600 ml. stainless steel autoclave. A solution of 2.5 grams of benzene-sulfinic acid in 40 ml. of methanol was added, and 0.1 gram of ferrous chloride in 10 ml. of methanol in a test tube was suspended in the autoclave so that the contents of the test tube would be discharged on rocking. Two hundred grams of liquid ethylene was charged into the autoclave in the manner described above, and the autoclave rocked for 20 hours at 0° C. The product was a white powder having a density of 1.096 g./cc. at 25° C.

EXAMPLE 10

A mixture of 50 cc. of thiophene-free benzene and 330 cc. of methanol was charged into a 1600 cc. stainless steel autoclave and a solution of 2 grams of ammonium persulfate in 5 cc. of water and 5 cc. of methanol was added. A test tube containing 2 grams of sodium bisulfite, 0.002 gram of ferrous ammonium sulfate, 5 cc. of water and 5 cc. of methanol was suspended in such a manner that rocking the autoclave would discharge the contents of the tube. Two hundred grams of oxygen-free liquid ethylene was charged in the manner described above and the autoclave rocked at 0° C. for 20 hours and ethylene polymer was isolated as a white powder.

EXAMPLE 11

A solution of 5 cc. of dibutyl zinc in 75 cc. of benzene and 25 cc. of methanol was charged into a 1600 cc. stainless steel autoclave which had previously been flushed with nitrogen. A test tube containing 4 grams of powdered, hydrated cupric sulfate was suspended in the autoclave in such a manner that rocking would discharge its contents. The autoclave was charged with 200 grams of liquid ethylene in the manner described above and then rocked at 0° C. for 20 hours. Unreacted ethylene was bled off and steam was blown through the reaction mixture until the benzene and methanol had been removed. A small amount of nitric acid was then added to dissolve the zinc and copper salts. The white solid which remained was washed with water, methanol and acetone, then air-dried to give a fluffy white powder. This polymer had a density of 0.965 g./cc. at 25° C. The bending modulus of hot pressed films was 113,000 lbs./sq. in.

EXAMPLE 12

A 325 cc. stainless steel tube was charged with 95 cc. methanol plus 1.0 gram sodium formaldehyde sulfoxylate and 2.0 cc. of 0.090% ferrous chloride tetrahydrate in methanol solution. The tube was flushed with nitrogen, evacuated, cooled to about −50° C. and 2 cc. of tertiary butyl hydroperoxide in 5 cc. of methanol added. The tube was again flushed with nitrogen, evacuated, cooled to about −50° C. and 100 grams of ethylene condensed within the tube. The tube and contents were agitated in a shaker box while the contents warmed up to 0° C. and were then immersed in ice/ice water and maintained at 0° C. for 18.5 hours. The pressure during this period was 620–660 lb./sq. in. Unreacted ethylene was bled off at 0.° C. and the tube opened. The ethylene polymer dispersion was filtered off, washed well with methanol and dried. The density of this ethylene polymer was 0.9944 g./cc. at 25° C.

EXAMPLE 13

To a 400 cc. stainless steel vessel was added 40 cc. methanol, 10 cc. of water, and after cooling to −15° C., 1 gram of potassium azodisulfonate. The vessel was sealed, evacuated, and cooled to −80° C. and 150 grams of liquid ethylene was bled in. The vessel was immersed in water at 0° C. for 24 hours, with the contents agitated by slowly rotating the vessel end over end. Unreacted ethylene was discharged and the tube was opened. A solid material amounting to 1.2 grams was collected. This product was waxy, insoluble in acetone or cold xylene but soluble in hot xylene.

EXAMPLE 14

A 400 cc. silver-lined vessel to which had been added 0.5 gram nickel-on-kieselguhr catalyst was dried by heating several hours at 100° C. under a pressure of 0.5 mm. mercury. The vessel was evacuated, and 150 cc. benzene containing 5 grams of lithium butyl was added under anhydrous conditions. The vessel was pressured with 150 grams of ethylene. The vessel and contents were rotated slowly end over end for 9.5 hours at 0° C. Unreacted ethylene was bled off. The solid polymer which formed was washed with water, dried and dissolved in hot xylene. The latter solution was added with stirring to an excess of methanol, and the ethylene polymer was recovered and dried. The solid polymer melted at 128.4° C., as determined by observing the disappearance of sperulites on a hot stage microscope.

EXAMPLE 15

To a glass-lined vessel was added 2 grams of N-nitrosoacetanilide (prepared according to Johnson and co-workers, J. Am. Chem. Soc. 65, 2446 (1943)), and 2 grams of dry thiophene-free benzene. The vessel was evacuated, cooled in liquid nitrogen and ethylene distilled in until the vessel was about one-third full of liquid ethylene (about 120 cc.). The reaction mixture was maintained at 0° C. for 11 days. The vessel was opened and unreacted ethylene allowed to escape. The solid material which was adhering to the walls of the reaction vessel was washed with acetone and dried. Five grams of waxy solid was collected which melted at 119° C. (hot stage microscope). It was insoluble in cold xylene but dissolved on heating in this solvent.

The polymerization of ethylene can be carried out in liquid ethylene as the sole reaction medium or in the presence of an organic medium which remains liquid below the critical temperature of ethylene (9.6° C.). Typical of such liquids are methanol, tertiary butanol, isooctane, toluene, xylene, and combinations thereof. Mixtures of water and organic liquids which are water soluble can also be used, if desired. Preferred reaction media are methanol, tertiary butanol, and benzene.

Emulsifying agents can be included in the reaction mixture, if desired, and examples are the potassium and sodium salts of long chain aliphatic carboxylic acids, the sodium and potassium salts of long chain alcohol sulfates or sulfonates, neutral agents such as the polyethylene oxide condensates, and quaternary ammonium salts, as well as other emulsifying agents common to the art.

The pH of the reaction medium may be varied within wide limits, depending upon the system used.

The temperature of the polymerization may be varied, from the critical temperature, which is 9.6° C. for ethylene, to temperatures of −50° C. or lower, the essential feature being when operating in this low temperature range that the ethylene be present as a liquid phase so that only nominal pressures are required to achieve a satisfactory monomer density that will lead to a high molecular weight, solid polymer of ethylene on polymerization. The pressures to be employed depend upon the nature of the polymerization medium and the degree of polymerization desired but must be sufficient to insure that the ethylene be present as a liquid phase with none, or at most an inconsequential part, present as a vapor phase. Pressures in the range of 10 to 100 atmospheres are normally sufficient. Higher pressures, e.g., up to 2000 atmospheres may, however, be used.

The examples illustrate a number of methods in which highly effective catalysts for the polymerization of ethylene are used. Some of these methods involve a system in which a peroxygen compound is dissociated in the presence of a polyvalent heavy ion in a lower valence state. The heavy metal ion is oxidized to its higher valence state and the peroxygen compound is reduced. The presence of the heavy metal is not critical for operativeness but its use in combination with peroxygen compounds constitutes a preferred mode of operation.

A preferred method of producing a reduction-oxidation catalyst for conducting polymerization in accord with the invention has been described, generally there being used in such a method a polyvalent heavy metal, an oxidizing agent, and for optimum results, a reducing agent to maintain the metal ion in the reduced state.

Examples of suitable oxidizing agents which also function as free radical producers include the peroxygen compounds, e.g., the salts of hydrogen peroxide, perborates, percarbonates, persulfates, perphosphates, percarboxylates; organic hydroperoxides such as methyl hydroperoxide, ethyl hydroperoxide, tertiary butyl hydroperoxide, tetralin hydroperoxide, cumene hydroperoxide, 1-hydroxy-cyclohexyl hydroperoxide-1, and numerous hydroperoxides obtained by adding one mole of hydrogen peroxide to a carbonyl group to obtain the grouping

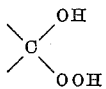

diacylperoxides such as benzoyl peroxide, acetyl peroxide, acetyl benzoyl peroxide, lauroyl peroxide, trichloroacetyl peroxide, crotonyl peroxide, etc.; alkyl acyl peroxides such as tertiary butyl perbenzoate, ditertiary butyl perphthalate, tertiary butyl permaleic acid, tertiary butyl perphthalic acid; hydrogen peroxide, peracetic acid, perbenzoic acid, di-isobutylene ozonide, methyl ethyl ketone peroxide, acetone-methyl isobutyl ketone peroxide, succinic acid peroxide, methyl isobutyl ketone peroxide, dibenzal diperoxide, polyperoxides, diethyl peroxydicarbonate, isopropyl percarbonate, pelargonyl peroxide and like materials. Amounts used are in the range of 0.005 to 3% by weight based on monomer.

The amount of heavy metal as a salt added to the polymerization mixture can be markedly lowered by the addition of an organic reducing agent which possesses the ability to reduce the valence of the metal, thus renewing the supply of unreduced metal when the reduced metal is oxidized. Under these conditions the amount of ferrous salt present, for example, is preferably in the range of 1–1000 parts per million based on the total amount of polymerizable monomer present. The rate of polymerization is markedly influenced by the amount of ferrous metal present with 100 parts per million giving much faster rates than 10 parts per million. The heavy metal can also be obtained by introduction of a simple or complex salt or compound in which the metal is present in the oxidized state provided that a suitable reducing agent is present to reduce it. Examples of such reducing agents are manifold and include such compounds as l-ascorbic acid, d-ascorbic acid, sodium formaldehyde sulfoxylate, dihydroxymaleic acid, formamidine sulfinic acid, butyraldehyde, sorbose, levulose, inosose, fructose, and glucose. These reducing agents are generally used in amounts of 0.005 to 3% based on the total amount of monomer present.

Aliphatic azo compounds operable in the practice of this invention are those which have an acyclic azo, —N=N, group and which decompose to yield free radicals below 9.6° C. Examples are alpha,alpha'-azo-diisobutyric acid, alpha,alpha' - azobis(alpha,gamma - dimethyl - gamma - methoxyvaleronitrile), alpha,alpha'-azobis(alpha,gamma - dimethyl - gamma - ethoxyvaleronitrile), alpha,alpha' - azobis(alpha,gamma,gamma - trimethylvaleronitrile), alpha,alpha' - azobis(alpha,gamma-dimethyl - gamma - butoxyvaleronitrile), alpha,alpha-azobis(alpha,gamma - dimethyl - gamma - phenylvaleronitrile), alpha,alpha' - azobis(alpha - phenylpropionitrile), potassium azodisulfonate, and the like. These compounds may be prepared by the procedure described in U.S. Patent 2,469,358, issued May 10, 1949, to W. L. Alderson and J. A. Robertson.

The ethylene homopolymers produced by the process of this invention with densities of at least 0.94 are markedly different in physical properties from ethylene polymers obtained by polymerizing gaseous ethylene under high pressures, e.g., 1500 atomspheres, with densities between about 0.91 and 0.925. The homopolymers of the invention have a minimum of chain branches, i.e., less than one methyl group per 200 carbon atoms in the polymer molecule, and in fact can be considered to be more or less linear in their molecular structure. The short side chains, when present especially in low density polymers, contain in the order of 6 atoms, more or less, of carbon in the branches and more than 7 atoms of carbon in the chain separating the branches. The structure is described in J. Am. Chem. Soc., "Chain Branching in Polyethylene During Polymerization," M. J. Roedel, 75, 6 110 (1953). This substantially linear structure of the high density polymers is chemically different from the molecular structures of the low density polymers which have more than one methyl side chain per 100 carbon atoms in the polymer molecule. Moreover, the homopolymers of the invention are substantially free from oxygen and contain no carbonyl groups substantially, as determined by infra-red analysis. The difference between the polymers of the invention and the polymers of the art is one of kind rather than one of degree as is demonstrated by the fact that the moisture permeability values are not additive when the polymers are blended together. Attention is directed to the drawing which illustrates the difference in kind which exists between the polymers of ethylene known to the art and the polymers of ethylene prepared according to this invention.

In the drawing, graphically shown by curve I is represented the moisture permeability of a blend of liquid phase ethylene polymer and vapor phase ethylene polymer plotted against percent composition. The ordinate is divided in moisture permeability units, the values given representing the grams of water transmitted per hour at a temperature of 39.6° C. per 100 sq. meters of surface area for film 1-mil thick with 100% relative humidity on one side of the film and zero percent relative humidity on the other side. The abscissa is divided in percentage composition by weight of the blended mixture. The blends were made from an ethylene polymer having a density of 0.9137 g./cc. at 25° C. prepared from gaseous ethylene at elevated temperatures and superatmospheric pressures and a liquid phase ethylene polymer produced in accord with the process of the instant case, having a density of 0.9757 g./cc. at 25° C.

The straight line of the drawing II represents the moisture permeability value that would be obtained if the properties of the blended polymers were additive using the moisture permeability value of the liquid phase polymer as substantially zero.

From curve I it will be noted, inter alia, that the addition of 20% of the ethylene polymer obtained by polymerizing liquid ethylene below its critical temperature to 80% of ethylene polymer obtained by polymerizing gaseous ethylene at elevated temperatures and pressures, reduced by 50% the moisture permeability of the latter polymer whereas if the blend properties were additive the moisture permeability could only have been reduced by 20%. This constitutes persuasive evidence that these two polymers must necessarily possess entirely different structures although they are both prepared from ethylene.

A further and outstanding difference between the liquid phase polymers and the vapor phase polymers of ethylene is demonstrated by the difference in their Young's bending modulus. Films of the polymer from gaseous ethylene exhibited a modulus from 14,000 to 24,000 p.s.i. compared to a modulus of 100,000 to 200,000 p.s.i. for films of the polymer from liquid ethylene.

The difference between these polymers is likewise shown by the fact that the density values are not additive for a 70/30 mixture of ethylene polymer made by polymerizing gaseous ethylene at elevated temperatures with an ethylene polymer made by polymerizing liquid ethylene below its critical temperature (densities 0.9137/0.9757). This mixture possesses a density of 0.9335 whereas by additive calculation the density should be 0.9323.

In a table a number of blends are shown together with their bending modulus, density, water vapor permeability together with the change of density imparted to the lower density polymer of the blend and the incremental improvement in its moisture vapor permeability. One of the oustanding values of these blends lies in their improved stiffness and P. V. and their enhanced potential to provide a series of packaging materials with improved combinations of stiffness and P.V.

*Table*

| Polymers | | Bending Modulus, p.s.i. | Density | P.V.* | Dd | DPV |
| A (Amt. by wgt.) | B (Amt. by wgt.) | | | | | |
| --- | --- | --- | --- | --- | --- | --- |
| 20 | 0 | 14,600 | 0.9137 | 82.5 | -------- | ----- |
| 18 | 2 | 22,500 | 0.9205 | 63.5 | +0.0006 | +10.9 |
| 16 | 4 | 31,000 | 0.9270 | 41.6 | +0.0009 | +25.6 |
| 14 | 6 | 46,000 | 0.9335 | 29.0 | +0.0012 | +28.8 |
| 20 | 8 | 64,000 | 0.9396 | 18.0 | +0.0009 | +31.5 |
| 10 | 10 | 70,000 | 0.9454 | 15.9 | +0.0007 | +25.4 |
| 0 | 20 | 125,000 | 0.9757 | Ca.0 | -------- | ------ |

A = Low density polyethylene; B = High density polyethylene.
(*) = Grams of water vapor transmitted per hour per 100 sq. meters for 1 mil thick film at 39.6° C. and 100% relative humidity on one side + 0% relative humidity on the other side of the film.
The addition of 20% of the high density polyethylene to the low density polyethylene doubles the stiffness and halves the moisture permeability of the latter.

Any suitable process may be used for preparing the blends such, for example, as by the Banbury mixers, roll mills, extrusion mixers or by the solution blending processes well known to the plastic art. Moreover, the resulting blends may be formed into the ultimate product by solution casting, extrusion molding, injection molding, pressure molding, and the like to form supported or unsupported films, rods, or other desired shapes.

The high density polymers can be made by processes other than those described in the Examples 1 through 15. Any suitable process can be used providing it produces an ethylene polymer having a density of more than about 0.94 and especially if it produces substantially linear polymers with less than one methyl side chain per 200 carbon atoms in the polymer molecule, with a melt index A.S.T.M. D1238–52T of less than 500. (The melt index of low density polymers is 10 or below.) Other processes for producing high density polymers are described in the copending application of Larchar and Pease, S.N. 240,044, filed April 2, 1951, now U.S. Patent 2,816,883, and U.S. Patent of Pease and Roedel, U.S. Patent 2,762,791, issued September 11, 1956.

The very high stiffness and the outstanding moisture impermeability of films of the polymer obtained by polymerizing liquid ethylene below the critical temperature make it eminently suitable for plastic outlets requiring good rigidity such as synthetic fibers, monofils, piping, electrical insulation and many kinds of fabricated articles. In particular, the ethylene polymers obtained from gaseous ethylene has been found to be an excellent plasticizer for the stiff polymer obtained from liquid ethylene, and valuable compositions can be obtained of varying degrees of stiffness by varying the compositions from 10/90 to 90/10 percent by weight. The outstanding moisture impermeability of these ethylene polymers makes the polymer obtained by polymerizing liquid ethylene well suited as a protective wrap for foodstuffs, cigarettes, baked goods, and the like.

The high moisture-vapor impermeability and high stiffness of the high density polymers of the invention and their equivalents, as hereinbefore described, make these polymers especially useful for the preparation of laminated products. The high density polymers with less than one methyl side chain per 200 carbon atoms in the molecule as a lamina impart their superior properties to laminates of a wide variety of thermoplastics such as the cellulose esters and ethers, e.g., cellulose acetate, cellulose nitrate, ethyl cellulose, cellulose acetobutyrate, etc.; the polymers such as the acrylate and methacrylate resins, polyamides, polystyrenes, polyvinyl acetates, and more especially, the low density polymers of ethylene. Flexible laminated films of one or more laminae of the high density homopolymers of ethylene with one or more laminae of the low density polymers of ethylene are especially useful for wrapping purposes, for the production of sheets, and uses generally where added stiffness and improved P.V. are required. The laminates may be made by hot pressing, with or without the use of a mutual adhesive, one lamina to another or by any suitable process.

I claim:

1. A laminate comprising one lamina of a homopolymer of ethylene having a density between 0.94 and 0.9757 at 25° C., less than one methyl side chain per 200 carbon atoms in the polymer molecule, and another lamina of a thermoplastic resin bonded thereto.

2. A laminated film comprising one lamina of a homopolymer of ethylene having a density between 0.94 and 0.9757 at 25° C. and less than one methyl side chain per 200 carbon atoms in the polymer molecule, and another lamina bonded thereto of a polymer of ethylene having a density between 0.91 and 0.925 at 25° C. and more than one methyl side chain per 100 carbon atoms.

References Cited in the file of this patent

UNITED STATES PATENTS 2,983,704     Roedel _____ May 9, 1961